US008908005B1

(12) United States Patent
Leske et al.

(10) Patent No.: US 8,908,005 B1
(45) Date of Patent: Dec. 9, 2014

(54) MULTIWAY VIDEO BROADCAST SYSTEM

(75) Inventors: Matthew John Leske, Stockholm (SE); Lennart Mikael Drugge, Stockholm (SE)

(73) Assignee: Google Inc., Mountain View, CA (US)

( * ) Notice: Subject to any disclaimer, the term of this patent is extended or adjusted under 35 U.S.C. 154(b) by 393 days.

(21) Appl. No.: 13/360,637

(22) Filed: Jan. 27, 2012

(51) Int. Cl.
    *H04N 7/14* (2006.01)
(52) U.S. Cl.
    USPC .................................... 348/14.09
(58) Field of Classification Search
    USPC ............... 348/14.08–14.09; 709/204, 226; 370/261, 263
    See application file for complete search history.

(56) References Cited

U.S. PATENT DOCUMENTS

| | | | | |
|---|---|---|---|---|
| 6,167,033 A * | 12/2000 | Chang et al. | ................... | 370/263 |
| 6,978,306 B2 * | 12/2005 | Miller et al. | ................... | 709/226 |
| 7,280,492 B2 * | 10/2007 | Magnuski | ..................... | 370/261 |
| 7,593,032 B2 | 9/2009 | Civanlar et al. | | |
| 7,643,560 B2 | 1/2010 | Hong et al. | | |
| 7,692,682 B2 * | 4/2010 | Pun et al. | ................... | 348/14.08 |
| 7,701,851 B2 | 4/2010 | Chakareski et al. | | |
| 7,933,294 B2 | 4/2011 | Chakareski et al. | | |
| 2005/0097169 A1 * | 5/2005 | Mukherjee et al. | ........... | 709/204 |
| 2007/0200923 A1 | 8/2007 | Eleftheriadis et al. | | |
| 2007/0206673 A1 | 9/2007 | Cipolli et al. | | |
| 2007/0230566 A1 | 10/2007 | Eleftheriadis et al. | | |
| 2007/0230568 A1 | 10/2007 | Eleftheriadis et al. | | |
| 2007/0263087 A1 | 11/2007 | Hong et al. | | |
| 2007/0291837 A1 | 12/2007 | Eleftheriadis | | |
| 2008/0159180 A1 | 7/2008 | Civanlar et al. | | |
| 2008/0159384 A1 | 7/2008 | Civanlar et al. | | |
| 2008/0159404 A1 | 7/2008 | Hong et al. | | |
| 2008/0165864 A1 | 7/2008 | Eleftheriadis et al. | | |
| 2008/0211901 A1 | 9/2008 | Civanlar et al. | | |
| 2008/0239062 A1 | 10/2008 | Civanlar et al. | | |
| 2009/0116562 A1 | 5/2009 | Eleftheriadis | | |
| 2010/0002069 A1 | 1/2010 | Eleftheriadis et al. | | |
| 2011/0182354 A1 | 7/2011 | Jang et al. | | |
| 2011/0222545 A1 | 9/2011 | Eleftheriadis | | |
| 2011/0292161 A1 | 12/2011 | Sharon et al. | | |
| 2012/0072499 A1 | 3/2012 | Cipolli et al. | | |
| 2012/0082214 A1 | 4/2012 | Horowitz et al. | | |
| 2012/0082237 A1 | 4/2012 | Jang et al. | | |

* cited by examiner

*Primary Examiner* — Mohammad Islam
(74) *Attorney, Agent, or Firm* — McDermott Will & Emery LLP

(57) ABSTRACT

A multiway video broadcast system may include a processor and a memory. The processor may facilitate steps of receiving a plurality of video streams from a plurality of user devices and broadcasting a first video stream of the plurality of video streams at a first quality level and the remaining video streams of the plurality of video streams at a second quality level, where the first quality level is higher than the second quality level. The steps may further include determining that a second video stream of the plurality of video streams should be broadcast at the first quality level, and in response to the determining, and irrespective of control signaling transmitted to the plurality of user devices, broadcasting the second video stream of the plurality of video streams at the first quality level and the remaining video streams of the plurality of video streams at the second quality level.

18 Claims, 5 Drawing Sheets

MULTIWAY VIDEO BROADCAST SYSTEM

TECHNICAL FIELD

The present description relates generally to multiway video broadcast systems, and more particularly, but not exclusively, to improving the video quality of a multiway video broadcast.

BACKGROUND

Multiple individual users engaging in a multiway video conference may be able to view and hear one another irrespective of the users' physical locations. In this manner, multiway video conferences may allow disparately located users to participate in activities generally associated with collocated users, such as panel discussions, multi-person interviews, or classes. Participants in multiway video conferences may be accustomed to fluctuations in the video quality of a video conference. Therefore, the participants may not be bothered if the video quality of the multiway video conference fluctuates.

In some instances, a multiway video conference may be of interest to third party viewers who are not participants in the multiway video conference. For example, third party viewers may be interested in viewing, in real-time, a discussion panel held via a multiway video conference. In these instances, the multiway video conference may be broadcast to third party viewers such that the third party viewers may view and hear each of the participants in the multiway video conference. However, because the third party viewers are viewers of a broadcast, rather than participants in a video conference, the third party viewers may be sensitive to any fluctuations in the video quality of the broadcast of the multiway video conference.

SUMMARY

The disclosed subject matter relates to a machine-implemented method for broadcasting a multiway video conference. The method may include receiving, using one or more computing devices, a plurality of video streams from a plurality of user devices. The method may further include broadcasting, using the one or more computing devices, the plurality of video streams, wherein a first video stream of the plurality of video streams is broadcast at a first quality level and the remaining video streams of the plurality of video streams are broadcast at a second quality level, the first quality level being higher than the second quality level. The method may further include determining, using the one or more computing devices, that a second video stream of the plurality of video streams should be broadcast at the first quality level, and in response to the determining, and independent of control signaling transmitted to the plurality of user devices, broadcasting, using the one or more computing devices, the second video stream of the plurality of video streams at the first quality level and broadcasting the remaining video streams of the plurality of video streams at the second quality level.

In another aspect, the machine implemented method may include receiving, using one or more computing devices, a plurality of video streams from a plurality of user devices, wherein a first video stream of the plurality of video streams is characterized by a first quality level and the remaining video streams of the plurality of video streams are characterized by a second quality level, the first quality level being higher than the second quality level. The method may further include transmitting, using the one or more computing devices and to each of the plurality of devices, the plurality of video streams corresponding to the other of the plurality of devices. The method may further include determining, using the one or more computing devices, that the plurality of video streams should be broadcast. The method may further include transmitting, using the one or more computing devices and to each of the plurality of user devices, an indication that each of the plurality of user devices should transmit a video stream at the first quality level, receiving, using the one or more computing devices, the plurality of video streams from the plurality of user devices, wherein each of the plurality of video streams is characterized by the first quality level, and broadcasting, using the one or more computing devices, the plurality of video streams, wherein the broadcasting the plurality of video streams is independent of the transmitting the plurality of video streams.

The disclosed subject matter also relates to a multiway video broadcast system. The system may include a processor and a memory including instructions that, when executed by the processor, cause the processor to facilitate the steps of: receiving a plurality of video streams from a plurality of user devices, broadcasting the plurality of video streams, wherein a first video stream of the plurality of video streams is broadcast at a first quality level and the remaining video streams of the plurality of video streams are broadcast at a second quality level, the first quality level being higher than the second quality level, determining that a second video stream of the plurality of video streams should be broadcast at the first quality level, and in response to the determining, and irrespective of control signaling transmitted to the plurality of user devices, broadcasting the second video stream of the plurality of video streams at the first quality level and broadcasting the remaining video streams of the plurality of video streams at the second quality level.

The disclosed subject matter also relates to a machine-readable medium comprising instructions stored therein, which when executed by a machine, cause the machine to perform a method that includes receiving, using one or more computing devices, a plurality of video streams from a plurality of user devices, wherein a first video stream of the plurality of video streams is characterized by a first quality level and the remaining video streams of the plurality of video streams are characterized by a second quality level, the first quality level being higher than the second quality level, transmitting, using the one or more computing devices and to each of the plurality of devices, the plurality of video streams corresponding to the other of the plurality of devices, and determining, using the one or more computing devices, that the plurality of video streams should be broadcast. The method may further include transmitting, using the one or more computing devices and to each of the plurality of user devices, an indication that each of the plurality of user devices should transmit a video stream at the first quality level, receiving, using the one or more computing devices, the plurality of video streams from the plurality of user devices, wherein each of the plurality of video streams is characterized by the first quality level, and broadcasting, using the one or more computing devices, the plurality of video streams, wherein the broadcasting the plurality of video streams is independent of the transmitting the plurality of video streams.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
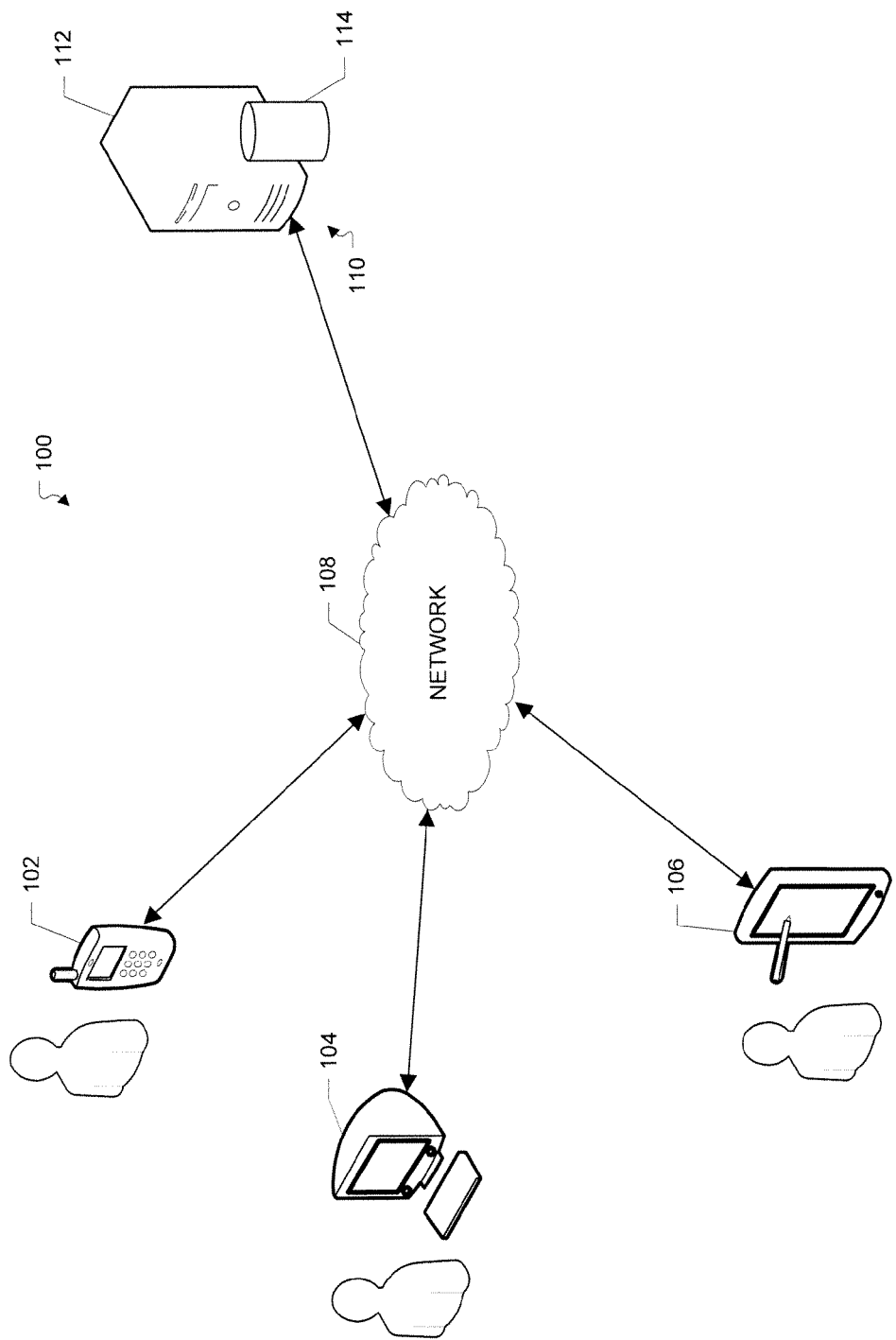
FIG. 1 illustrates an example client-server network session that may provide for a broadcast of a multiway video conference.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

I. Overview

Hosted multiway video conferencing technology enables individual users located in disparate geographic locations, and operating disparate devices, such as devices having different operating systems, different screen resolutions, different processing capabilities, etc., to engage in a video conference without the need for each user to possess expensive video conferencing equipment. In one example, a user may engage in a hosted multiway video conference using any web browser-enabled device. In this manner, hosted multiway video conferencing may allow users to view and hear one another, such as in order to participate in panel discussions, multi-person interviews, or classes, irrespective of the users' geographic locations and with minimal user device requirements.

In a hosted multiway video conference, it may be desirable to conserve bandwidth, such as bandwidth between the user devices and the hosting server. In the aforementioned scenarios there may only be a single participant communicating to the other participants of the multiway video conference at any given time, such as a single participant speaking to the other participants. It may be desirable for the device of the communicating participant to transmit a high quality video stream; however, high quality video may not be as imperative for the non-communicating participants. As such, the bandwidth consumed by the multiway video-conference may be reduced by causing the devices of the non-communicating participants to transmit a low quality video stream, while still allowing the device of the communicating participant to transmit a high quality video stream. The quality of a video stream may be increased, such as from a low quality video stream to a high quality video stream, or decreased, such as from a high quality video stream to a low quality video stream, by changing the resolution of the video stream, changing the frame rate of the video stream, changing the image quality of the video stream, or generally by changing any parameters that may impact the quality of the video stream.

The server hosting the multiway video conference may determine the communicating participant, and may send a control message to the device of the communicating participant indicating that the device should transmit a high quality video stream. If the communicating participant changes, the server may send a control message to the device of the previously communicating participant indicating that the device should transmit a low quality video stream, and the server may send a control message to the device of the presently communicating participant indicating that the device should transmit a high quality video stream. Since the server needs to determine a change in the communicating participant and then send a control message to the device of the presently communicating participant indicating that the device should transmit a high quality video stream, there may be a delay between the time when the communicating participant changes, such as the time when a different participant begins speaking, and the time when the device of the presently communicating participant transmits a high quality video stream.

The delay in switching to a high quality video stream may not be noticeable to the multiway video conference participants, as the multiway video conference participants may not expect to continuously receive high quality video. However, in some instances, the multiway video conference may be broadcast to third party viewers, who are not participants in the multiway video conference. For example, third party viewers may be interested in viewing, in real-time, a discussion panel held via a multiway video conference. The multiway video conference may be broadcast to the third party viewers through a composite video stream that includes the video streams of each of the participants in the multiway video conference. The broadcast stream may include the high quality video stream for the communicating participant, and the low quality video stream for the non-communicating participants. However, when the communicating participant changes, such as when a different participant begins speaking, the aforementioned delay may occur before the video stream of the presently communicating participant is broadcast in high quality.

The delay in broadcasting the video stream of the communicating participant in high quality may be noticeable to the third party viewers of the broadcast multiway video conference, as the third party viewers may expect the communicating participant to always be broadcast in high quality. Therefore, when a multiway video conference is being broadcast to third party viewers, the detriment associated with the delay in broadcasting the video stream of a communicating participant in high quality may outweigh the benefit of the bandwidth reduction achieved by causing the devices of non-communicating participants to transmit video streams in low quality.

As such, in order to minimize the delay in broadcasting a high quality video stream for a communicating participant, the server may send a control message to the device of each participant in the multiway video conference indicating that the device should transmit a video stream at the highest quality the device is capable of, when a broadcast of the multiway video conference is initiated. Since the participants may be operating disparate devices, such as devices having different operating systems, different screen resolutions, different processing capabilities, etc., the highest quality video stream each device is capable of may differ for each participant's device. Therefore, the control message sent to the devices may reference a video quality that is relative to each device's capabilities, such as the highest quality video stream that the device is capable of, rather than referencing a fixed video quality. The control message may also indicate that the device should encode the video stream with a scalable video codec ("SVC"), such as the H.264 SVC, if the device is not already encoding the video stream with such a codec.

Video streams encoded with a scalable video codec, such as H.264 SVC, may include a base layer and one or more enhancement layers. The base layer may be used to render the video stream with a particular video quality, such as a particular frame rate or resolution, and the enhancement layer may be used, in conjunction with the base layer, to render the video stream at a higher video quality, such as a higher frame rate or a higher resolution. The enhancement layer may only include the information required to render the video stream at the higher video quality, rather than including information for recreating the entire video stream. In this manner, a device receiving a video stream encoded with a scalable video codec may render the video stream at the quality level best suited for the capabilities of the device, such as the processing power of the device, the display size of the device, etc.

In regards to the broadcast of the multiway video conference, since the video streams of the participants are encoded with a scalable video codec, the server may broadcast the video stream of the communicating participant at high quality, i.e. using the base and enhancement layers, and the server may simultaneously broadcast the video stream of the non-communicating participants at a lower quality, i.e. using only the base layer. Further in this regard, by using the base and enhancement layers, the server may be able to change between broadcasting a given video stream in low quality (rendering the video stream using only the base layer) and broadcasting the given stream in high quality (rendering the video stream using the base and enhancement layers), without the delay associated with sending a control message to the device of the presently communicating participant indicating that the device should transmit a high quality video stream.

Accordingly, when the server determines a change in the communicating participant, the server may, in response, substantially immediately change the broadcast quality of the video stream of the presently communicating participant to high quality, such as using the base and enhancement layers, while the server may also substantially immediately change the broadcast quality of the video stream of the previously communicating participant to low quality, i.e. using only the base layer. As such, since the server does not need to send a control message to the device of the presently communicating user that indicates that the device should transmit a high quality video stream, there may be little or no noticeable delay in changing the quality of the video stream of a communicating participant.

Furthermore, since the video stream of every participant is transmitted in the highest quality the participant's device is capable of, a user administrating the broadcast of the multiway video conference may, in real time, choose which participants' video streams should be broadcast in high quality, such as by using the base and enhancement layers, and which participants' video streams should be broadcast in low quality, such as by only using the base layer. Similarly, since the video stream of every participant is transmitted in the highest quality each participant's device is capable of, the server may record the video stream of each participant in high quality, and a user post-processing the broadcast of the multiway video conference may choose which participants' video streams should be shown in high quality, and which videos streams should be shown in low quality, in the post-processed video.

II. Example Client-Server Network Environment for a Multiway Video Broadcast System FIG. 1 illustrates an example client-server network environment which may implement a multiway video broadcast system. Network environment 100 may include a number of electronic devices 102, 104, 106 communicably connected to server 110, such as by network 108. In another example, electronic devices 102, 104, 106 may be communicably connected to one another, such as by network 108, but not communicably connected to server 110. Network 108 may be a public communication network (such as the Internet, cellular data network, dialup modems over a telephone network) or a private communications network (such as private local area network ("LAN"), leased lines). Network 108 may also include, but is not limited to, any one or more of the following network topologies, including a bus network, a star network, a ring network, a mesh network, a star-bus network, a tree or hierarchical network, and the like.

In some example embodiments, electronic devices 102, 104 and 106 can be computing devices such as laptop or desktop computers, smartphones, personal digital assistants ("PDAs"), portable media players, tablet computers, televisions or other displays with one or more processors coupled thereto or embedded therein, or other appropriate computing devices that can be used to for displaying a web page or web application. In the example of FIG. 1, electronic device 102 is depicted as a smartphone, electronic device 104 is depicted as a desktop computer and electronic device 106 is depicted as a tablet device.

In one example, server 110 includes processing device 112 and data store 114. Processing device 112 executes computer instructions stored in data store 114, for example, to broadcast a multiway video conference to one or more of the electronic devices 102, 104, 106. Data store 114 may store the computer instructions on non-transitory computer-readable medium.

In one example, server 110 may be a single computing device such as a computer server. In another example, server 110 may represent more than one computing device working together to perform the actions of a server computer (such as a cloud of computers and/or a distributed system). In another example, server 110 may be coupled with various databases, storage services, or other computing devices. Server 110 and the coupled databases, storage services, or other computing devices may be collocated, or may be disparately located.

Communications between electronic devices 102, 104, 106, and server 110 may be facilitated through the Hypertext Transfer Protocol ("HTTP") communication protocol. Other communication protocols may also be used including, for example, Extensible Messaging and Presence Protocol (XMPP) communication, for some or all communications between electronic devices 102, 104, 106 and server 110. In another example, the electronic devices 102, 104, 106 may be in communication with one another without communicating with server 110.

Users interacting with electronic devices 102, 104, 106 may participate in a multiway video conference, or may receive a broadcast of a multiway video conference. The phrase "multiway video conference" as used herein encompasses its plain and ordinary meaning and may also refer to a video conference between two or more electronic devices 102, 104, 106, where each electronic device transmits a video and/or audio stream, and each electronic device receives a video and/or audio stream from at least one other of the electronic devices. Accordingly, the electronic devices 102, 104, 106, may include, or may be coupled to, a camera, or other device for capturing video and/or audio, and may include an output device for viewing video and/or hearing audio.

In one example, if users interacting with electronic devices 102, 104, 106 are participating in a multiway video conference hosted by server 110, the electronic devices 102, 104, 106, may transmit video streams to the server 110. The phrase "hosting device" as used herein encompasses its plain and ordinary meaning and may also refer to a device that is hosting a multiway video conference. The hosting device, such as the server 110, may transmit the video stream of each electronic device 102, 104, 106 to the other electronic devices 102, 104, 106.

The server 110 may also transmit control signals, such as control information, to each of the electronic devices 102, 104, 106. The phrase "control information" as used herein encompasses its plain and ordinary meaning and may also refer to any information that relates to the control of the electronic devices 102, 104, 106. For example, the control information may include information pertaining to the quality level of the video stream being transmitted by the electronic devices 102, 104, 106, such as a codec to be used to encode the video stream, parameters to be used in encoding the video stream, a frame rate of the video stream, a resolution of the video stream, a bit rate of the video stream, an image quality of the video stream, or generally any information that may affect the quality of the video stream. The electronic devices 102, 104, 106 may receive the control information and may change the quality level of their video streams in accordance with the control information, as necessary.

In another example, the control information may include an indication of the quality level of the video stream that is relative to the capabilities of each of the electronic devices 102, 104, 106. For example, the control information may include an indication that the video stream should be transmitted at the highest quality level that the electronic devices 102, 104, 106 are capable of, at the lowest quality level that the electronic devices 102, 104, 106 are capable of, at a median quality level that the electronic devices 102, 104, 106 are capable of, or the control information may include any qualifier regarding the quality level of the video stream for which a corresponding video quality is known, or is determinable, by the electronic devices 102, 104, 106. The phrase "highest quality level that a device is capable of" as used herein encompasses its plain and ordinary meaning and may also refer to the highest quality level that a device can transmit video based on one or more variables related to the operation of the device, such as the processing capabilities of the device, the resolution of a camera coupled to the device, the bandwidth available to the device, or generally any other variable related to the operation of the device or the transmission of the video stream from the device.

For example, if the user interacting with the electronic device 102 is a communicating participant of a multiway video conference, such as a speaking participant, the server 110 may transmit control information to the electronic device 102 indicating that the device should transmit a video stream at a first quality level, such as high quality level or the highest quality level the device of capable of. The phrase "communicating participant," as used herein, encompasses its plain and ordinary meaning and may also refer to a participant in a multiway video conference who is presently speaking, presently performing sign language, or generally any participant presently communicating information to the other participants in any manner. If the users interacting with the electronic devices 104, 106 are non-communicating participants of the multiway video conference, such as not presently speaking, the server 110 may transmit control information to the electronic devices 104, 106 indicating that the electronic devices 104, 106 should transmit video streams at a second quality level, such as a quality level lower than the first quality level. The phrase "non-communicating participant" as used herein encompasses its plain and ordinary meaning and may also refer to a participant in a multiway video conference who is not presently communicating with the other participants in the multiway video conference.

In one example, the video quality of the video streams associated with non-communicating participants may be optimized to reduce bandwidth and processing usage for the corresponding electronic devices 102, 104, 106 and the server 110. If the user interacting with the electronic device 102 is no longer a communicating participant, such as the user stops speaking, and the user interacting with electronic device 104 becomes a communicating participant, such as the user starts speaking, the server 110 may transmit control information to the electronic device 102 indicating that the electronic device should transmit a video stream at the second quality level, such as a lower quality level, and the server 110 may transmit control information to the electronic device 104 indicating that the electronic device should transmit video at the first quality level, such as a high quality level.

Therefore, when a user interacting with an electronic device 102 changes from a non-communicating participant to a communicating participant, there may be delay before the electronic device 102 transmits a video stream at the higher quality level. The delay may be a result of the time necessary for the server 110 to determine that the user interacting with the electronic device 102 has started communicating and to transmit the appropriate control information, to the electronic device 102. As a result of the delay, the other participants may receive a low quality video stream for a newly communicating participant until the electronic device 102 receives the control information from the server 110 and begins transmitting a high quality video stream.

The multiway video conference may be broadcast to third party viewers interacting with electronic devices 102, 104, 106. The broadcast of a multiway video conference may be a composite video stream that includes the video stream of each of the participants in the multiway video conference. The third party viewers of the broadcast may not be participants in the multiway video conference, although the participants in the multiway video conference may also receive the broadcast of the multiway video conference. The broadcast of the multiway video conference may be transmitted by one of the electronic devices 102, 104, 106, by the server 110, or by any other computing device receiving the video stream of each participant in the multiway video conference. The phrase "broadcasting device" as used herein encompasses its plain and ordinary meaning and may also refer to an electronic device that is broadcasting a multiway video conference. In one example, the broadcasting device may be a computer, such as a bot, at a data center that has access to a large number of bandwidth and processing resources. The broadcast of the multiway video conference may be initiated by one or more triggers which are discussed in more detail in FIG. 3 below.

When a broadcast of the multiway video conference is initiated, the server 110 may signal control information to the electronic devices 102, 104, 106 of each participant in the multiway video conference indicating that the electronic devices 102, 104, 106 should transmit a video stream at the highest quality the device is capable of. Alternatively, the server 110 may signal the control information during an already occurring broadcast of a multiway video conference. As mentioned above, the highest quality video that each device is capable of may be dependent upon, or relative to, the capabilities of each of the electronic devices 102, 104, 106. Alternatively, or in addition, the control information may include values corresponding to one or more variable associated with the quality of the video stream, such as values for the frame rate, resolution, or bit rate of the video stream. The control information may also indicate that the electronic devices 102, 104, 106 should encode the video stream with a scalable video codec that encodes video streams with a base layer and at least one enhancement layer, such as the H.264 SVC. In one example, the video streams may be encoded with multiple enhancement layers, where each enhancement layer corresponds to an increased quality level of the video stream, such as increased resolution, frame rate, or bit rate.

The electronic devices 102, 104, 106 may receive the control information from the server 110 and may begin transmitting video streams at the quality level indicated by the control information, such as at the highest quality level each device is capable of. The server 110 may receive the video stream of each of the electronic devices 102, 104, 106, and may transmit the video stream of each electronic device to the other electronic devices 102, 104, 106 such as by using the base and enhancement layers, or using only the base layer. The server 110 may also broadcast the video stream of each of the electronic devices 102, 104, 106 to the third party viewers as a composite video using the base and enhancement layers, or using only the base layer. The transmission of the video stream to the electronic devices 102, 104, 106 of the participants in the multiway video conference may be separate from, and independent of, the transmission of the broadcast of the multiway video conference to the electronic devices 102, 104, 106 of the third party viewers.

Since the video streams received by the server 110 from the electronic devices 102, 104, 106 of the participants are encoded with a base layer and an enhancement layer, the server 110 may substantially immediately broadcast a high quality video stream for a given participant, such as using the base layer and enhancement layer, such as in response to determining that a the participant has changed from a non-communicating participant to a communicating participant. Accordingly, the server 110 may begin broadcasting a high quality video stream associated with a newly communicating participant without having to transmit any control information to the electronic device of the newly communicating participant. Thus, the server 110 may substantially immediately broadcast high quality video, such as using the base and enhancement layers of the video stream, or low quality video, such as using only the base layer of the video stream, independent of, and irrespective of, any control signaling between the server 110 and the electronic devices 102, 104, 106. The broadcast of a high quality video stream for a newly communicating participant is discussed in more detail in FIG. 2 below.

III. Example Processes for Broadcasting a Multiway Video Conference

Figure 2:
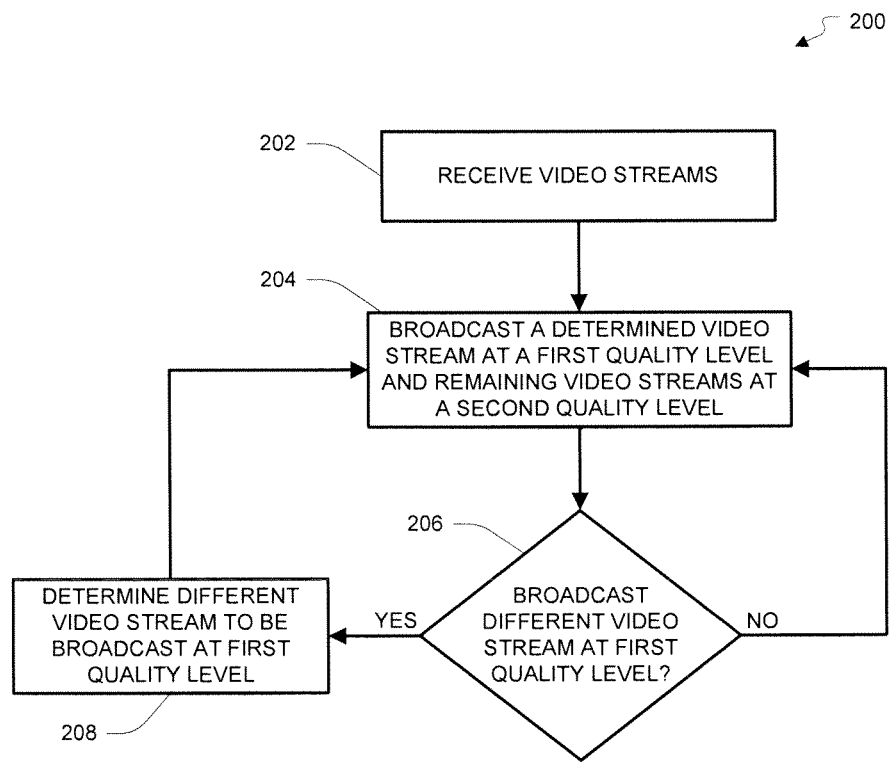
FIG. 2 illustrates a flow diagram of an example process for broadcasting a multiway video conference.

FIG. 2 illustrates a flow diagram of an example process 200 for broadcasting a multiway video conference. In block 202, a broadcasting device, such as one or more of the electronic devices 102, 104, 106 or the server 110, may receive video streams from the device of each participant in a multiway video conference. The device of each participant may transmit the video streams at the highest quality level that each device is capable of. In one example, the video streams may be encoded using a scalable video codec such that each video stream includes a base layer and an enhancement layer. In block 204, the broadcasting device may broadcast a composite video stream that includes each of the received video streams. The broadcasting device may broadcast a determined video stream of the received video streams, such as a video stream associated with a communicating participant, at a first quality level, such as a high quality level. The broadcasting device may broadcast the remaining video streams, such as the video streams associated with the non-communicating participants, at a second quality level, such as a low quality level. In one example, the second quality level may be lower than the first quality level.

If the video streams include a base layer and an enhancement layer, the broadcasting device may broadcast the determined video stream at the high quality level by using both the base and enhancement layers of the video stream, and the broadcasting device may broadcast the remaining video streams at the low quality level by using only the base layer of the video streams.

In block 206, the broadcasting device may determine whether a different, or another, video stream should be broadcast at the first quality level, such as the high quality level. For example, the broadcasting device may determine that a participant associated with another video stream has started communicating, the broadcasting device may determine that the previously communicating participant is no longer communicating, or the broadcasting device may receive an indication that the video stream associated with another participant should be transmitted at the first quality level. If, at block 206, the broadcasting device does not determine that a different, or another, video stream should be broadcast at the first quality level, the broadcasting device returns to block 204.

If, at block 206, the broadcasting device determines that a different, or another, video stream should be broadcast at the first quality level, then the broadcast device proceeds to block 208. At block 208, the broadcasting device determines, or identifies, a different, or another, video stream that should be broadcast at the first quality level. The broadcasting device then returns to block 204. At block 204, the broadcasting device starts broadcasting the newly determined video stream at the first quality level, and broadcasting the remaining video streams at the second quality level. In one example, the broadcasting device may broadcast more than one video stream at the first quality level, and the broadcasting device may broadcast only one video stream at the second quality level.

For example, if the video streams include a base layer and an enhancement layer, the broadcasting device may start broadcasting the newly determined video stream using both the base and enhancement layers. Since the broadcasting device receives the video stream of each participant with a base and an enhancement layer, the broadcasting device may substantially immediately start broadcasting the newly determined video stream at the first quality level, such as by using both the base and enhancement layer. As such, the broadcasting device can broadcast video streams for any of the participants at the first or second quality levels independent of, and irrespective of, any control signaling transmitted to the devices of the participants, because the broadcasting device receives a video stream from each participant device that can be used to render the video stream at both the first quality level, such as by using the base and enhancement layers, or at the second quality level, such as by using only the base layer.

Further in this regard, the broadcasting device can broadcast video streams for any of the participants at the first or second quality level using the base and/or enhancement layers without transcoding, or further processing, the received video streams. Thus, the broadcasting device may broadcast video streams for any of the participants at the first or second quality level independent of, and irrespective of, any transcoding of the video streams.

Figure 3:
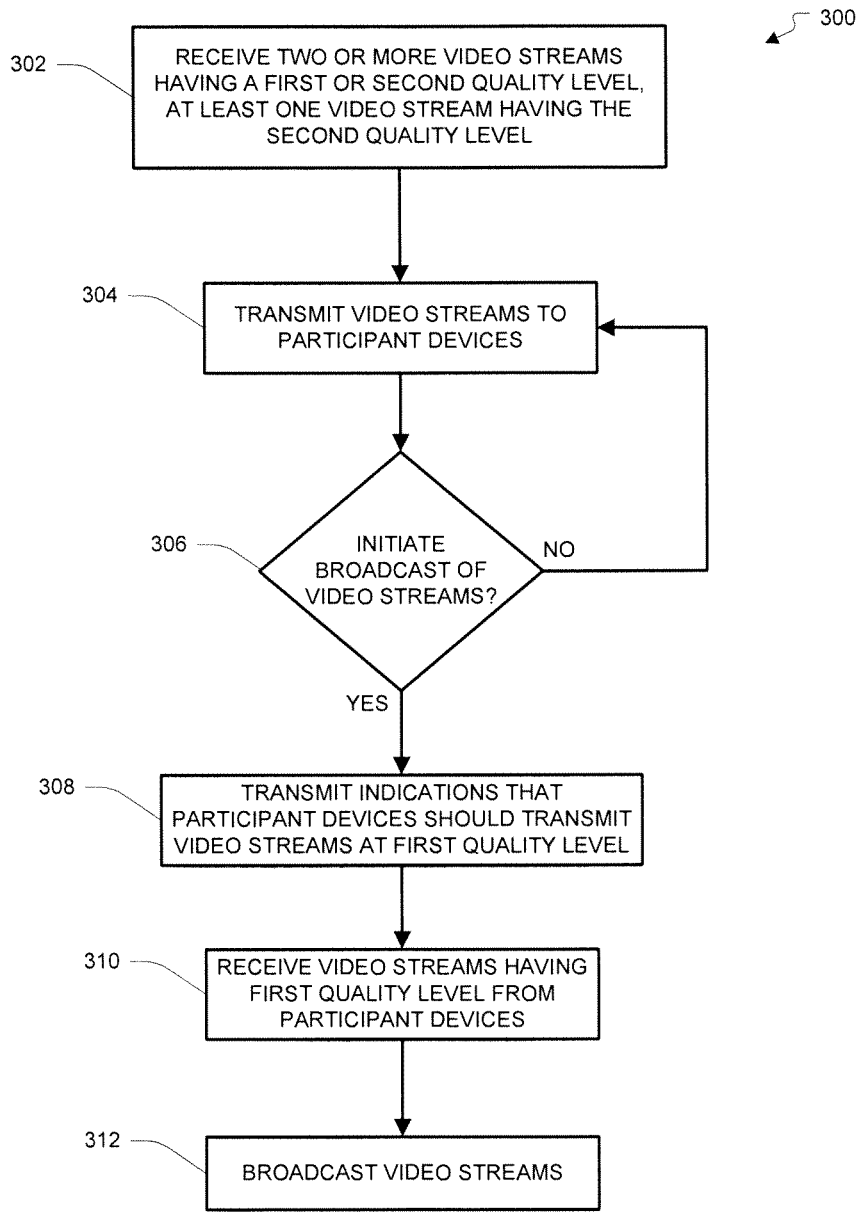
FIG. 3 illustrates a flow diagram of an example process for initiating a broadcast of a multiway video conference.

FIG. 3 illustrates a flow diagram of an example process 300 for initiating a broadcast of a multiway video conference. In block 302, a hosting device of a multiway video conference, such as one or more of the server 110 and the electronic devices 102, 104, 106, may receive video streams from the participants of the multiway video conference, such as two or more video streams having a first or second quality level, with at least one of the video streams having the second quality level. For example, the first quality level may be higher than the second quality level, and video streams of communicating participants may be received at the first quality level, while video streams of non-communicating participants may be received at the second quality level. If a participant in the multiway video conference is determined to have changed from a communicating participant to a non-communicating participant, the server 110 may signal control information to the device of the participant indicating that the device should start transmitting a video stream at the second quality level. Conversely, if a participant in the multiway video conference is determined to have changed from a non-communicating participant to a communicating participant, the server 110 may signal control information to the device of the participant indicating that the device should start transmitting a video stream at the first quality level.

At block 304, the hosting device transmits the video stream received from the device of each participant to the devices of each of the other participants in the multiway video conference. At block 306, the hosting device determines whether to initiate a broadcast of the received video streams of the multiway video conference, such as to third party viewers.

There may be several mechanisms for triggering the initiation of the broadcast of the multiway video conference. For example, a participant in the multiway video conference may select a setting to initiate the broadcast of the multiway video conference, the system may suggest to a user to initiate a broadcast of a multiway video conference if the amount of available bandwidth satisfies a threshold, or based on the country or region of origin where one or more of the participants, or the hosting device, are located. In another example, a participant of the multiway video conference may be allowed to initiate a broadcast of the multiway video conference if one or more of the participants satisfies a metric derived from a social network, such as the number of followers one of the participants has, the number of followers the participants collectively have, or generally any metric relating to the popularity of one or more of the participants of the multiway video conference. In another example, the system may use heuristics based on one or more of the aforementioned examples, and may present a setting to one of the participants that allows the participant to initiate the broadcast of the multiway video conference, or to select an option to automatically initiate the broadcast the multiway video conference with an option to opt-out.

Alternatively, or in addition, a multiway video conference may have been previously initiated and may be presently occurring. In this example, at block 306 the broadcasting device, or the hosting device, may determine whether to initiate a broadcast optimized mode for the presently occurring broadcast of the multiway video conference, rather than determining whether to initiate the broadcast of the multiway video conference.

There may be several mechanisms for triggering the broadcast optimized mode. For example, a user interacting with the broadcasting device may select to enter the broadcast optimized mode via a setting, such as a setting in an application facilitating the multiway video conference. The application setting may only be available if one or more of the participants satisfies a metric derived from a social network, such as the number of followers one of the participants has, the number of followers the participants collectively have, or generally any metric relating to the popularity of one or more of the participants of the multiway video conference. In another example, the hosting device or broadcasting device may automatically enter the broadcast optimized mode when the device determines that the broadcast is occurring and that one or more bandwidth thresholds are satisfied, as observed from the server or client side. In another example, the broadcast optimized mode may be automatically initiated based on the country or region of origin of one or more of the participants, or of the hosting device. In another example, the system may use heuristics based on one or more of the aforementioned examples, and may present a setting to one or more the participants that allows the participant to initiate the broadcast optimized mode, or that allows the participant to select to automatically initiate the broadcast optimized mode with an option to opt-out.

In another example, the broadcast or the broadcast optimized mode may be deactivated if the criteria of one or more of the aforementioned mechanisms is no longer satisfied. Alternatively, or in addition, a participant in the multiway video conference may deactivate the broadcast or the broadcast optimized mode.

If, at block 306, the hosting device determines that a broadcast of the video streams of the multiway video conference has been initiated, or that a broadcast is ongoing and the broadcast optimized mode has been initiated, the server 110 moves to block 308. At block 308, the server 110 transmits an indication to the devices of the participants of the multiway video conference indicating that the devices should transmit video streams at the second quality level, for example the highest quality level that the devices are capable of transmitting. The indication may be signaled are part of control information transmitted to the devices of the participants. In one example, the indication may be transmitted to each of the devices simultaneously. Alternatively, or in addition, the indication may be transmitted to each device individually, such as based on whether the user interacting with the device is a communicating participant. Alternatively, or in addition, the indication may be transmitted to the devices of a number of the most recently communicating participants.

In one example, the control information transmitted to the devices may include one or more values relating to the quality level of the video stream. For example, the control information may include a frame rate of the video stream, a resolution of the video stream, a bit rate of the video stream, or parameters for tuning the codec used to encode the video streams.

In another example, if there is not enough bandwidth to receive high quality video streams from each of the participants, the control information may indicate that the non-visible or non-communicating participants should not send any video stream to the hosting device. Alternatively, or in addition, the hosting device may not transmit the video streams for non-visible or non-communicating participants to the broadcasting device, or the hosting device may transmit a reduced quality video stream for non-visible or non-communicating participants to the broadcasting device.

In another example, the control information transmitted to the devices may also include information pertaining to the quality of the audio streams transmitted by the devices. For example, the control information may include parameters for tuning the audio codec to based on the type, or content, of audio being transmitted, such as speech, conversations, music, or generally any type of audio. The parameters may be applied to the audio codec at the cost of increased bandwidth usage. In this regard, if bandwidth is limited the quality of non-communicating participants may be reduced, or the hosting device may not receive audio from the non-communicating participants.

The hosting device or broadcasting device may also process or transcode a received audio stream to improve the quality of the audio stream. For example, the server may perform noise reduction, echo cancellation, or similar enhancements that may result in a higher quality audio stream being broadcast. The audio processing or transcoding may also be performed the devices of the participants, or of the third party viewers, at the cost of increased bandwidth or processor usage.

At block 310, the hosting device may receive video streams having the first quality level from the device of each participant. At block 312, the hosting device may broadcast the video streams of the participants at the first or second quality level. For example, a composite video stream including the video stream of each of the participants may be broadcast to devices of third party viewers. Alternatively, the hosting device may transmit the video streams to a broadcasting device, such as a device of one of the participants, and the broadcasting device may broadcast the composite video stream to the devices of the third party viewers.

In one example, the hosting device or the broadcasting device may individually record the video streams of each of the participants at the first quality level, such as a high quality level. The video streams may then be post-processed and composited into a new recording that shows each of the participants at the first quality level, irrespective of whether the participant was broadcast at the first quality level.

In another example, the hosting device or the broadcasting device may record the composite video stream of the broadcast and may allow a user to edit the composite video stream in real-time, such as by allowing the user to select which participants should be in-focus and which participants should be broadcast at the high quality level, irrespective of whether the participants are presently communicating. For example, it may be desirable to broadcast a non-communicating participant at a high quality level in order to view the non-communicating participant's reaction to a communicating participant.

IV. Example Composite Video Broadcast

Figure 4:
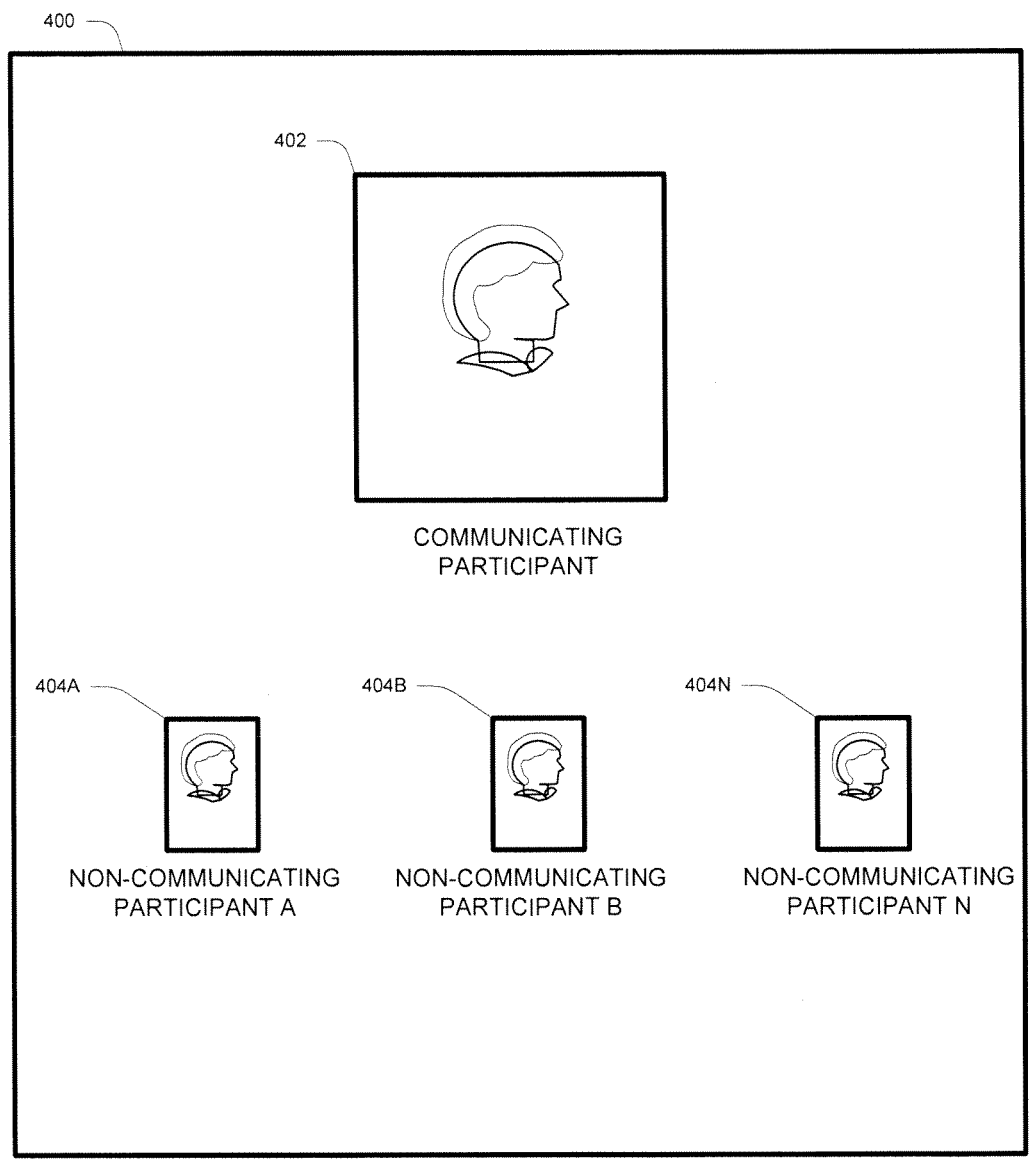
FIG. 4 illustrates an example screenshot of a composite video broadcast of a multiway video conference.

FIG. 4 illustrates an example screenshot of a composite video broadcast 400 of a multiway video conference. The composite video broadcast 400 may include a video stream 402 of a communicating participant, and video streams 404A-N of non-communicating participants. The video stream 402 of the communicating participant may have a high quality level, while the video streams 404A-N of the non-communicating participants may have a low quality level. The video stream 402 of the communicating participant may be displayed in a larger portion of the composite video broadcast 400 than the video streams 404A-N of the non-communicating participants. Alternatively, or in addition, the video streams 402 of the communicating participant may be displayed in focus, while the video streams 404A-N of the non-communicating participants may be displayed out of focus.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

V. Example Multiway Broadcast System

Figure 5:
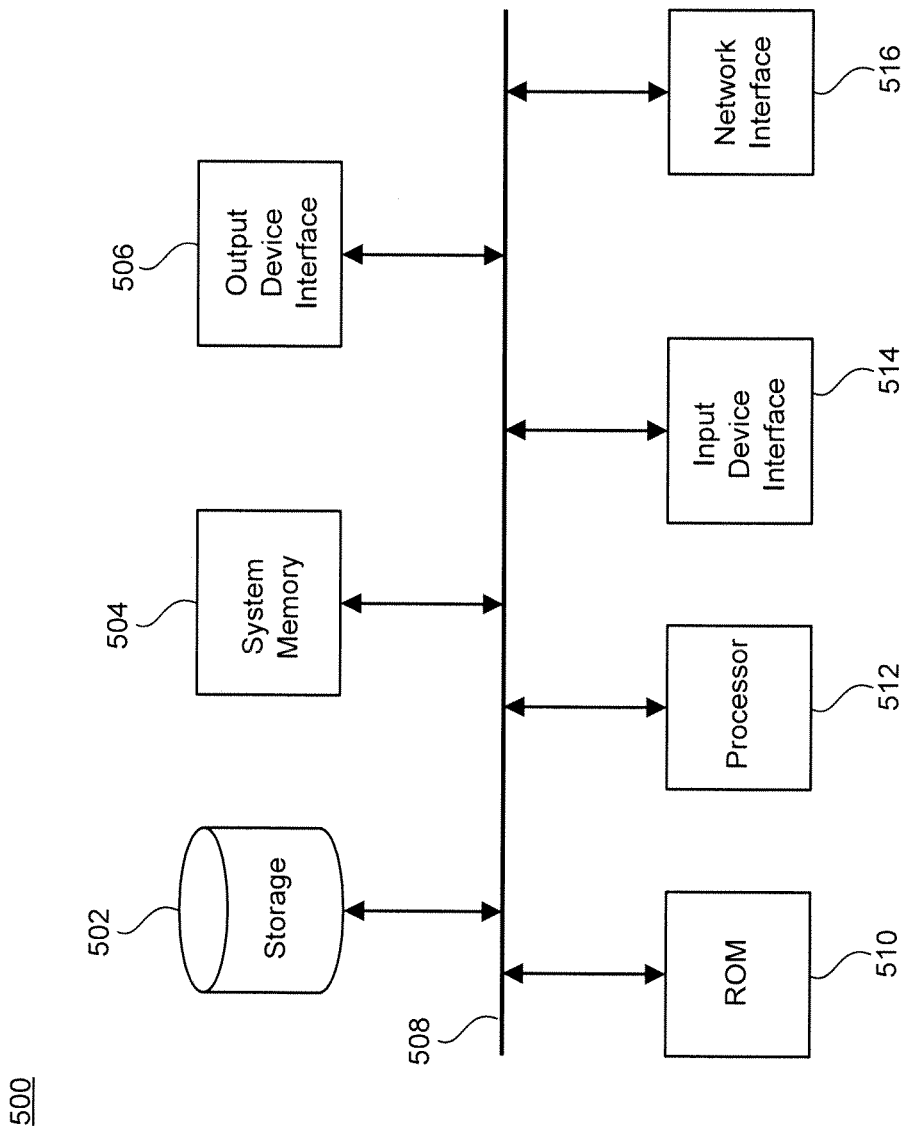
FIG. 5 conceptually illustrates an electronic system with which some implementations of the subject technology may be implemented.

FIG. 5 conceptually illustrates an electronic system with which some implementations of the subject technology are implemented. Electronic system 500 can be a server, computer, phone, PDA, a tablet computer, a television with one or more processors embedded therein or coupled thereto, or generally any electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. For example, the various memory units include instructions for securing participant contact information within a collaboration session in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, such as a data server, or that includes a middleware component, such as an application server, or that includes a front end component, such as a client computer having a graphical user interface or a Web browser through which a user can interact with an implementation of the subject matter described in this specification, or any combination of one or more such back end, middleware, or front end components. The components of the system can be interconnected by any form or medium of digital data communication, such as a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The term website, as used herein, may include any aspect of a website, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method for broadcasting a multiway video conference, the method comprising:

transmitting, using one or more computing devices and to each of a plurality of user devices, an indication that the user device should transmit a video stream at a high quality level relative to a capability of the user device;

receiving, using the one or more computing devices and based on the transmitted indication, a plurality of video streams from the plurality of user devices;

broadcasting, using the one or more computing devices, the plurality of video streams, wherein a first video stream of the plurality of video streams is broadcast at a first quality level and the remaining video streams of the plurality of video streams are broadcast at a second quality level, the first quality level being higher than the second quality level, and wherein the broadcasting is based on a determination that the first video stream is associated with a participant who is currently communicating in the multiway video conference;

determining, using the one or more computing devices, that the participant who is currently communicating has changed, from being associated with the first video stream to a second video stream of the plurality of video streams; and in response to the determining, and independent of control signaling transmitted to the plurality of user devices, updating the broadcast, using the one or more computing devices, so that the second video stream of the plurality of video streams is broadcast at the first quality level and the remaining video streams of the plurality of video streams are broadcast at the second quality level, wherein the broadcast is for third-party viewers not participating in the multiway video conference, and wherein the broadcast comprises a composite video stream which includes each of the plurality of video streams.

2. The method of claim 1, wherein each of the plurality of video streams comprises base layer data and enhancement layer data.

3. The method of claim 2, wherein broadcasting the second video stream of the plurality of video streams at the first quality level comprises broadcasting the second video stream using the base layer data and the enhancement layer data.

4. The method of claim 3, wherein broadcasting the remaining video streams of the plurality of video streams at the second quality level comprises broadcasting the remaining video stream of the plurality of video streams using the base layer data exclusive of the enhancement layer data.

5. The method of claim 2, further comprising:
storing, using the one or more computing devices, each of the plurality of video streams; and
processing, using the one or more computing devices, the stored plurality of video streams, wherein the first video stream of the stored plurality of video streams is processed using the base layer data exclusive of the enhancement layer data and the second video stream of the stored plurality of video streams is processed using the base layer data and the enhancement layer data.

6. The method of claim 1, further comprising rendering the composite video stream comprising each of the plurality of video streams.

7. The method of claim 1, further comprising transmitting, using the one or more computing devices and to each of the plurality of devices, the video streams corresponding to the other of the plurality of devices, wherein the transmitting the plurality of video streams is independent of the broadcasting the plurality of video streams.

8. The method of claim 1, wherein determining that the second video stream should be broadcast at the first quality level comprises receiving, using the one or more computing devices, an indication that the second video stream should be broadcast at the first quality level.

9. The method of claim 1, wherein the first and second quality levels correspond to at least one of a frame rate, a resolution, an image quality, or a bit rate of the plurality of video streams.

10. A computer-implemented method for broadcasting a multiway video conference, the method comprising:
receiving, using one or more computing devices, a plurality of video streams from a plurality of user devices, wherein a first video stream of the plurality of video streams is characterized by a first quality level and the remaining video streams of the plurality of video streams are characterized by a second quality level, the first quality level being higher than the second quality level;
transmitting, using the one or more computing devices and to each of the plurality of devices, the plurality of video streams corresponding to the other of the plurality of devices;
determining, using the one or more computing devices, that the plurality of video streams should be broadcast;
transmitting, using the one or more computing devices and to each of the plurality of user devices, an indication that each of the plurality of user devices should transmit a video stream at the first quality level;
receiving, using the one or more computing devices, the plurality of video streams from the plurality of user devices, wherein each of the plurality of video streams is characterized by the first quality level; and
broadcasting, using the one or more computing devices, the plurality of video streams for third-party viewers not participating in the multiway video conference,
wherein the broadcasting the plurality of video streams is independent of the transmitting the plurality of video streams,
wherein the broadcasting comprises broadcasting a second video stream of the plurality of video streams at a third quality level and the remaining video streams of the plurality of video streams at a fourth quality level, the third quality level being higher than the fourth quality level,
wherein the broadcasting is based on a determination that the second video stream is associated with a participant who is currently communicating in the multiway video conference, and
wherein the broadcasting comprises rendering a composite video stream which includes each of the plurality of video streams.

11. The method of claim 10, wherein the first quality level and the second quality level comprise an indication of quality that is relative to the capabilities of each of the plurality of user devices.

12. The method of claim 11, wherein the first quality level comprises a highest quality video stream that each of the plurality of user devices is capable of transmitting.

13. A system, comprising:
a processor; and
a memory including instructions that, when executed by the processor, cause the processor to facilitate the steps of:
transmitting, to each of a plurality of user devices, an indication that the user device should transmit a video stream at a high quality level relative to a capability of the user device;
receiving, based on the transmitted indication, a plurality of video streams from the plurality of user devices;
broadcasting the plurality of video streams, wherein a first video stream of the plurality of video streams is broadcast at a first quality level and the remaining video streams of the plurality of video streams are broadcast at a second quality level, the first quality level being higher than the second quality level, and wherein the broadcasting is based on a determination that the first video stream is associated with a participant who is currently communicating in the multiway video conference;
determining that the participant who is currently communicating has changed, from being associated with the first video stream to a second video stream of the plurality of video streams; and
in response to the determining, and irrespective of control signaling transmitted to the plurality of user devices, updating the broadcast so that the second video stream of the plurality of video streams is broadcast at the first quality level and the remaining video streams of the plurality of video streams are broadcast at the second quality level,
wherein the broadcast is for third-party viewers not participating in the multiway video conference, and
wherein the broadcast comprises a composite video stream which includes each of the plurality of video streams.

14. The system of claim 13, wherein each of the plurality of video streams comprises base layer data and enhancement layer data.

15. The system of claim 14, wherein broadcasting the second video stream of the plurality of video streams at the first quality level comprises broadcasting the second video stream using the base layer data and the enhancement layer data.

16. The system of claim 15, wherein broadcasting the remaining video streams of the plurality of video streams at the second quality level comprises broadcasting the remaining video stream of the plurality of video streams using the base layer data exclusive of the enhancement layer data.

17. A non-transitory machine readable medium embodying instructions that, when executed by a machine, allow the machine to perform a method for broadcasting a multiway video conference, the method comprising:

receiving a plurality of video streams from a plurality of user devices, wherein a first video stream of the plurality of video streams is characterized by a first quality level and the remaining video streams of the plurality of video streams are characterized by a second quality level, the first quality level being higher than the second quality level;

transmitting, to each of the plurality of devices, the plurality of video streams corresponding to the other of the plurality of devices;

determining that the plurality of video streams should be broadcast;

transmitting, to each of the plurality of user devices, an indication that each of the plurality of user devices should transmit a video stream at the first quality level;

receiving the plurality of video streams from the plurality of user devices, wherein each of the plurality of video streams is characterized by the first quality level; and broadcasting the plurality of video streams for third-party viewers not participating in the multiway video conference, wherein the broadcasting the plurality of video streams is independent of the transmitting the plurality of video streams, wherein the broadcasting comprises broadcasting a second video stream of the plurality of video streams at a third quality level and the remaining video streams of the plurality of video streams at a fourth quality level, the third quality level being higher than the fourth quality level, wherein the broadcasting is based on a determination that the second video stream is associated with a participant who is currently communicating in the multiway video conference, and wherein the broadcasting comprises rendering a composite video stream which includes each of the plurality of video streams.

18. The computer-readable medium of claim 17, wherein the first quality level and the second quality level comprise an indication of quality that is relative to the capabilities of each of the plurality of user devices.

\* \* \* \* \*